(12) United States Patent
Vidojevic

(10) Patent No.: US 11,291,227 B2
(45) Date of Patent: Apr. 5, 2022

(54) AUTOMATIC KETTLE LOCKING SYSTEMS FOR POPCORN MACHINES

(71) Applicant: C. Cretors & Company, Wood Dale, IL (US)

(72) Inventor: Nenad Vidojevic, Chesterton, IN (US)

(73) Assignee: C. Cretors & Company, Wood Dale, IL (US)

(*) Notice: Subject to any disclaimer, the term of this patent is extended or adjusted under 35 U.S.C. 154(b) by 479 days.

(21) Appl. No.: 16/211,067

(22) Filed: Dec. 5, 2018

(65) Prior Publication Data
US 2019/0364938 A1 Dec. 5, 2019

Related U.S. Application Data

(60) Provisional application No. 62/594,654, filed on Dec. 5, 2017.

(51) Int. Cl.
*A23L 7/187* (2016.01)
*A47J 27/62* (2006.01)
(Continued)

(52) U.S. Cl.
CPC ............... *A23L 7/187* (2016.08); *A47J 27/62* (2013.01); *A23L 7/161* (2016.08); *A23L 7/183* (2016.08); *G07F 17/0078* (2013.01)

(58) Field of Classification Search
CPC ........... A23L 7/187; A23L 7/181; A23L 7/161
(Continued)

(56) References Cited

U.S. PATENT DOCUMENTS

| 884,771 A | 4/1908 | Snow |
| 1,251,291 A | 12/1917 | Scheeffer |

(Continued)

FOREIGN PATENT DOCUMENTS

| CN | 2363205 Y | 2/2000 |
| CN | 2865302 Y | 2/2007 |

(Continued)

OTHER PUBLICATIONS

"Induceramic, infrared honeycomb ceramic burner plate, using Wayback Machine," retrieved from https://web.archive.org/web/20140228035423/http://www.induceramic.com/industrial-ceramics-application/machinery-and-industrial-equipment/coating-equipment/infrared-honeycomb-ceramic-burner-plate, (Year: 2014), 4 pages.
Platvoet et al., "Process Burner 101," American Institute of Chemical Engineers; Retrieved on Aug. 19, 2019 from https://www.aiche.org/sites/default/files/cep/20130835.pdf Copyright 2013 (Year: 2013), 5 pages.

(Continued)

*Primary Examiner* — Reginald Alexander
(74) *Attorney, Agent, or Firm* — Perkins Coie LLP

(57) ABSTRACT

Systems and methods for preventing dumping of a popping kettle in a popcorn machine above a preset temperature to facilitate fire containment are disclosed herein. In some embodiments, a popcorn machine can include one or more temperature control systems to prevent the popping kettle from exceeding a normal operating temperature range. In the event such systems fail, however, embodiments of the present technology include lock systems that will lock the popping kettle in an upright position before the kettle reaches a temperature that will ignite the popping oil. Locking the popping kettle in this manner prevents an operator from inadvertently dumping burning oil onto popcorn piled in the bottom of the cabinet, igniting the popcorn and causing the fire to spread. Locking the kettle can also provide additional time for a fire suppression system to extinguish the fire while it is contained in the kettle.

21 Claims, 3 Drawing Sheets

(51) Int. Cl.
*G07F 17/00* (2006.01)
*A23L 7/183* (2016.01)
*A23L 7/161* (2016.01)

(58) Field of Classification Search
USPC .............. 99/323.4, 323.5, 323.7, 323.9, 337
See application file for complete search history.

(56) References Cited

U.S. PATENT DOCUMENTS

| | | |
|---|---|---|
| 1,308,241 A | 7/1919 | Hutchinson |
| 1,339,662 A | 5/1920 | Morgan |
| 1,436,400 A | 11/1922 | Mabey |
| 1,477,704 A | 12/1923 | Holcomb et al. |
| 1,501,114 A | 7/1924 | Howe |
| 1,525,966 A | 2/1925 | Vickers |
| 1,786,877 A | 12/1930 | Thompson |
| 1,880,822 A | 10/1932 | Cook et al. |
| 1,898,968 A | 2/1933 | Wyland |
| 1,961,812 A | 6/1934 | Burch |
| 1,987,388 A | 1/1935 | Cretors |
| 2,123,663 A | 7/1938 | Roach |
| 2,198,152 A | 4/1940 | Cooley et al. |
| 2,232,954 A | 2/1941 | Manley |
| 2,248,812 A | 7/1941 | Cretors |
| 2,467,866 A | 4/1949 | Smolderen et al. |
| 2,477,416 A | 7/1949 | Page |
| 2,537,744 A | 1/1951 | Cretors |
| 2,549,449 A * | 4/1951 | Gibson .................... H01F 1/20 99/323.9 |
| 2,570,126 A | 10/1951 | Hobbs |
| 2,575,643 A | 11/1951 | Tamsen |
| 2,586,347 A | 2/1952 | Kloster |
| 2,654,823 A | 10/1953 | Altemiller |
| 2,812,704 A | 11/1957 | Hawks |
| 2,856,841 A | 10/1958 | Cretors et al. |
| 2,858,761 A | 11/1958 | Denniss |
| 2,907,264 A | 10/1959 | Bushway |
| 2,918,956 A | 12/1959 | Otto |
| 2,939,379 A | 6/1960 | Schmitt |
| 2,984,169 A | 5/1961 | Bushway |
| 3,095,326 A | 6/1963 | Green et al. |
| D196,811 S | 11/1963 | Lasar |
| 3,120,168 A | 2/1964 | Lippert |
| 3,140,952 A | 7/1964 | Cretors |
| 3,167,453 A | 1/1965 | Cretors |
| 3,251,579 A | 5/1966 | Lasar |
| 3,280,720 A | 10/1966 | Kuhn |
| 3,291,304 A | 12/1966 | Fuchs |
| 3,421,475 A | 1/1969 | Evans et al. |
| 3,450,068 A | 6/1969 | Temple |
| 3,512,989 A | 5/1970 | Smith |
| 3,554,115 A | 1/1971 | Manley et al. |
| 3,568,782 A | 3/1971 | Cox |
| 3,569,670 A * | 3/1971 | Eff ......................... F24C 14/02 219/413 |
| 3,584,585 A | 6/1971 | Hansel et al. |
| 3,697,289 A | 10/1972 | Day et al. |
| 3,739,953 A | 6/1973 | Cretors |
| 3,757,084 A * | 9/1973 | McLean ................ F24C 15/022 219/413 |
| 3,783,854 A | 1/1974 | Hurko et al. |
| 3,812,774 A | 5/1974 | Day et al. |
| 3,930,996 A | 1/1976 | Day et al. |
| 4,120,236 A | 10/1978 | Blomberg |
| 4,152,974 A | 5/1979 | Tienor |
| 4,165,620 A | 8/1979 | Gehauf nee Kiesel et al. |
| 4,173,925 A | 11/1979 | Leon |
| 4,178,843 A | 12/1979 | Crabtree et al. |
| 4,182,229 A | 1/1980 | VandeWalker |
| 4,206,695 A | 6/1980 | Cretors |
| 4,288,686 A | 9/1981 | Cretors |
| 4,289,079 A | 9/1981 | Swistun |
| 4,329,068 A | 5/1982 | Neuner et al. |
| 4,331,124 A | 5/1982 | Seidel et al. |
| 4,337,584 A | 7/1982 | Johnson |
| 4,345,144 A * | 8/1982 | Bergquist .............. F24C 15/022 126/197 |
| 4,417,505 A | 11/1983 | Pietrobelli |
| 4,438,682 A | 3/1984 | King et al. |
| 4,444,553 A | 4/1984 | Christodoulou |
| 4,494,314 A | 1/1985 | Gell, Jr. |
| 4,512,247 A | 4/1985 | Friedman |
| D285,404 S | 9/1986 | Wang |
| 4,648,719 A | 3/1987 | Roben et al. |
| 4,649,263 A | 3/1987 | Goodlaxson |
| 4,658,708 A | 4/1987 | Rastoin |
| 4,702,158 A | 10/1987 | Ishihara |
| D294,448 S | 3/1988 | Otto |
| 4,763,568 A | 8/1988 | Kiczek |
| 4,828,146 A | 5/1989 | Stein |
| 4,881,457 A | 11/1989 | Lyga et al. |
| 5,013,575 A | 5/1991 | Stadler et al. |
| 5,033,363 A | 7/1991 | King et al. |
| 5,035,173 A | 7/1991 | Stein et al. |
| 5,046,481 A | 9/1991 | Warwick |
| 5,069,923 A | 12/1991 | Hubbard et al. |
| 5,083,505 A | 1/1992 | Kohlstrung et al. |
| 5,154,161 A | 10/1992 | Rogers et al. |
| 5,176,069 A | 1/1993 | Chen |
| 5,180,898 A | 1/1993 | Alden et al. |
| 5,203,256 A | 4/1993 | Mueller |
| 5,237,912 A | 8/1993 | Fins |
| 5,263,405 A | 11/1993 | Simon |
| 5,301,601 A | 4/1994 | Cretors |
| 5,311,930 A | 5/1994 | Bruenn |
| 5,315,919 A | 5/1994 | Hoebergs |
| 5,332,102 A | 7/1994 | Sennett et al. |
| 5,339,726 A | 8/1994 | Poulson |
| 5,397,219 A | 3/1995 | Cretors |
| 5,417,148 A | 5/1995 | Cavallo |
| 5,419,239 A | 5/1995 | Covington et al. |
| 5,445,073 A | 8/1995 | Gilwood |
| 5,501,139 A | 3/1996 | Lee et al. |
| 5,513,558 A | 5/1996 | Erickson et al. |
| 5,539,671 A | 7/1996 | Albrecht et al. |
| 5,555,792 A | 9/1996 | Stein et al. |
| 5,579,681 A | 12/1996 | Ubert et al. |
| 5,590,582 A | 1/1997 | Weiss |
| 5,605,091 A | 2/1997 | Garber |
| 5,645,878 A | 7/1997 | Breslin et al. |
| 5,662,024 A | 9/1997 | Cretors et al. |
| D384,548 S | 10/1997 | Hsieh |
| 5,690,018 A | 11/1997 | Hansen |
| 5,694,830 A | 12/1997 | Hodgson et al. |
| 5,699,720 A | 12/1997 | Stein et al. |
| 5,743,172 A | 4/1998 | Weiss et al. |
| 5,771,779 A | 6/1998 | Stein et al. |
| 5,782,165 A | 7/1998 | Glenboski et al. |
| 5,787,798 A | 8/1998 | Stein et al. |
| 5,857,403 A | 1/1999 | Mann |
| 5,871,792 A | 2/1999 | Weiss et al. |
| 5,890,033 A | 3/1999 | Parker |
| 5,979,301 A | 11/1999 | Perttola |
| 6,000,318 A | 12/1999 | Weiss et al. |
| 6,021,707 A | 2/2000 | Bauer et al. |
| D426,422 S | 6/2000 | Otto |
| 6,082,248 A | 7/2000 | Turrel |
| 6,098,526 A | 8/2000 | Stein et al. |
| 6,123,011 A | 9/2000 | Cretors |
| 6,164,192 A | 12/2000 | Stein et al. |
| 6,164,193 A | 12/2000 | Perttola |
| 6,234,063 B1 | 5/2001 | Evers et al. |
| 6,234,064 B1 | 5/2001 | Turrel |
| 6,331,323 B1 | 12/2001 | Adler-Nissen et al. |
| 6,352,731 B1 | 3/2002 | Weiss |
| 6,374,727 B1 | 4/2002 | Cretors |
| 6,382,087 B1 | 5/2002 | Iiyama |
| 6,412,395 B1 | 7/2002 | Weiss et al. |
| 6,412,396 B1 | 7/2002 | Wright |
| 6,461,033 B2 | 10/2002 | Palmer et al. |
| 6,534,103 B2 | 3/2003 | Weiss |
| 6,578,468 B1 | 6/2003 | Horn |
| 6,612,225 B1 | 9/2003 | Mann |

(56) References Cited

U.S. PATENT DOCUMENTS

| | | |
|---|---|---|
| 6,619,280 B1 | 9/2003 | Zhou et al. |
| 6,669,304 B2 | 12/2003 | Binning |
| 6,672,201 B2 | 1/2004 | Evans, Sr. et al. |
| 6,872,923 B2 | 3/2005 | Cretors et al. |
| 6,914,226 B2 | 7/2005 | Ottaway |
| 7,082,891 B2 | 8/2006 | Watson |
| 7,259,357 B2 | 8/2007 | Walker |
| 7,285,300 B1 | 10/2007 | Allington et al. |
| 7,721,643 B2 | 5/2010 | Berger et al. |
| 7,874,244 B1 | 1/2011 | Rhome |
| 8,011,622 B1 | 9/2011 | Guthrie |
| 8,201,492 B2 | 6/2012 | Cretors |
| 8,216,622 B2 | 7/2012 | Evans, Sr. et al. |
| D672,789 S | 12/2012 | Bongiovanni |
| 8,464,634 B2 | 6/2013 | Cretors et al. |
| 8,651,014 B2 | 2/2014 | Vidojevic et al. |
| 8,794,129 B2 | 8/2014 | Cretors |
| 8,869,679 B2 | 10/2014 | Ryan et al. |
| 8,887,626 B2 | 11/2014 | Baker, Jr. |
| 8,899,144 B2 | 12/2014 | Snyder |
| 9,144,247 B2 | 9/2015 | Cretors |
| 9,198,532 B2 | 12/2015 | Barrows et al. |
| 9,408,496 B2 | 8/2016 | Cretors |
| D802,982 S | 11/2017 | Vidojevic |
| 10,136,664 B2 | 11/2018 | Ryan et al. |
| 10,299,499 B2 | 5/2019 | Rhome |
| 2001/0045444 A1 | 11/2001 | Muramatsu et al. |
| 2002/0147006 A1 | 10/2002 | Coon et al. |
| 2002/0166454 A1 | 11/2002 | Weiss et al. |
| 2003/0159591 A1 | 8/2003 | Evans et al. |
| 2003/0168438 A1 | 9/2003 | Zhou |
| 2004/0045444 A1 | 3/2004 | Mann |
| 2004/0045542 A1 | 3/2004 | Zhou et al. |
| 2004/0074397 A1 | 4/2004 | Calhoun |
| 2004/0265993 A1 | 12/2004 | Darling et al. |
| 2005/0056154 A1 | 3/2005 | Fu |
| 2005/0086814 A1 | 4/2005 | Huang |
| 2006/0149415 A1 | 7/2006 | Richards |
| 2009/0041915 A1 | 2/2009 | Biechteler |
| 2009/0056558 A1 | 3/2009 | Cretors et al. |
| 2009/0126579 A1 | 5/2009 | Cretors et al. |
| 2009/0145242 A1 | 6/2009 | Pryor, Jr. et al. |
| 2009/0208621 A1 | 8/2009 | Dotan |
| 2009/0223378 A1 | 9/2009 | Cretors |
| 2010/0270282 A1 | 10/2010 | Fernandez et al. |
| 2011/0014340 A1 | 1/2011 | Spitzley et al. |
| 2011/0027434 A1 | 2/2011 | Cretors et al. |
| 2011/0076372 A1 | 3/2011 | Cretors |
| 2011/0076373 A1 | 3/2011 | Cretors et al. |
| 2011/0120317 A1 | 5/2011 | Rhome |
| 2011/0185914 A1 | 8/2011 | Snyder |
| 2011/0274804 A1 | 11/2011 | Barrows et al. |
| 2012/0266756 A1 | 10/2012 | Cretors |
| 2013/0022727 A1 | 1/2013 | Sherwin |
| 2013/0276640 A1 | 10/2013 | Cretors |
| 2013/0276641 A1 | 10/2013 | Vidojevic |
| 2013/0280386 A1 | 10/2013 | Cretors |
| 2013/0298781 A1 | 11/2013 | Ganuza et al. |
| 2014/0093636 A1 | 4/2014 | Fitzgerald et al. |
| 2014/0311356 A1 | 10/2014 | Daniels |
| 2015/0064320 A1 | 3/2015 | Cretors |
| 2017/0290360 A1 | 10/2017 | Vidojevic |
| 2018/0020864 A1 | 1/2018 | Cretors et al. |
| 2019/0364938 A1 | 12/2019 | Vidojevic |

FOREIGN PATENT DOCUMENTS

| | | |
|---|---|---|
| CN | 201701013 U | 1/2011 |
| CN | 203424825 U | 2/2014 |
| CN | 203737561 | 7/2014 |
| DE | 8624682 | 12/1986 |
| DE | 20120429 U1 | 7/2002 |
| EP | 0364071 | 4/1990 |
| FR | 2401387 | 3/1979 |
| GB | 0688223 | 3/1953 |
| GB | 717654 | 10/1954 |
| JP | S59135849 | 8/1984 |
| JP | 2006081587 A | 3/2006 |
| WO | WO-9310698 | 6/1993 |
| WO | WO-9706699 A1 | 2/1997 |
| WO | WO-2004054384 A1 | 7/2004 |
| WO | WO-2012145717 A1 | 10/2012 |

OTHER PUBLICATIONS

Cretors Coater Mixer Tumbler, http://www.cretors.com/store/catalog.asp?item=39&category_id=3, Copyright 2014, 1 page.

C. Cretors and Co., "Diplomat" product manual for models DI20C, DI32C, DI20F, DI32F, DI205, TDI205, TDI206, DI325 and TDI326; 1996, 58 pages.

C. Cretors and Co., "Diplomat" product manual for models DI20CP, DI32CP, DI20FP and DI32FP; 1989, 62 pages.

C. Cretors and Co.; Multi-product sell sheet for "The New Diplomat Counter Showcase" and "Thunder Kettle" for models G48E, EPR48E5 and PR48E5; dated 1990, 2 pages.

Gold Medal Products Co., "Funfood Equipment & Supplies" catalog; vol. 56, dated 2000, 108 pages.

LOEB Equipment 20 Gallon Groen Model DNTA20 Twin Scrape Agitated Jacketed Kettle; www.loebequipment.com, Oct. 31, 2011, 1 page.

Proctor Companies; "Concession Stands and Equipment" catalog, vol. 3, 1996, 84 pages.

Proctor Companies; Equipment Catalog, 1992, 33 pages.

Suspended Poppers: 20 oz., 32 oz., 48 oz., 60 oz., C. Cretors and Company, published Nov. 2004, 6 pages.

Topping & Dispensing Systems, C. Cretors and Company Product Brochure, pp. 36-39, published Oct. 2005, 5 pages.

Topping Systems, C. Cretors and Company, published Nov. 2003, 2 pages.

"How to Succeed in the Caramel Corn Business," Gold Medal Products Company, Copyright 2011, gmpopcorn.com, 24 pages.

International Search Report and Written Opinion received in International Application No. PCT/US20/23702, dated Jun. 9, 2020, 9 pages.

\* cited by examiner

AUTOMATIC KETTLE LOCKING SYSTEMS FOR POPCORN MACHINES

CROSS-REFERENCE TO RELATED APPLICATION

This application claims priority to U.S. Patent Application No. 62/594,654, titled "AUTOMATIC KETTLE LOCKING SYSTEMS FOR POPCORN MACHINES," and filed Dec. 5, 2017, which is incorporated herein by reference in its entirety.

TECHNICAL FIELD

The present disclosure is generally related to popcorn machines and, more particularly, to kettle locking systems for preventing the spread of accidental kettle fires in popcorn machines.

BACKGROUND

Conventional popcorn machines used in, for example, movie theaters and other similar settings typically include a popping kettle positioned inside a cabinet. The cabinet usually has one or more transparent sides or doors for viewing the popping process and the freshly-popped corn. The popping process is started by placing unpopped corn and oil together in the kettle, and heating the kettle until the corn begins to pop. As the corn pops, the kettle fills and the freshly popped corn overflows into the bottom of the cabinet. At the conclusion of the popping cycle, an operator can rotate the kettle downwardly by use of a dump handle to empty the kettle of any remaining contents. Popcorn machines having at least some of the foregoing features are disclosed in U.S. Pat. No. 6,872,923, which is incorporated herein by reference in its entirety.

Most fires in popcorn machines are caused by overheated kettles that ignite the popping oil in the kettle. Some popcorn machines include systems to contain and/or suppress such fires. One such system is described in U.S. Pat. No. 8,651,014 (the "'014 patent), which is incorporated herein by reference in its entirety. The system described in the '014 patent includes a fusible link that is installed in the cabinet above the kettle. The fusible link is configured to melt at a threshold temperature which is indicative of a fire in the cabinet. In the event of a fire, the fusible link breaks and cuts off power to the kettle heating elements. At the same time, however, power is provided to a blower that provides fresh air toward the base of the fire. The incoming flow of fresh air contains the fire in a rear portion of the cabinet, while a system of nozzles positioned in an upper portion of the cabinet sprays a fire extinguishing agent, such as $CO_2$ or foam, onto the fire to extinguish it.

There are two standard safety tests for popcorn machines having fire containment/suppression systems such as those disclosed in the '014 patent. In both of these tests, the thermostats for kettle temperature control are bypassed and the kettle is allowed to overheat until the oil in the kettle ignites and burns. In the first test, the fusible link above the kettle breaks from the heat of the kettle fire, but discharge of the fire extinguishing agent is delayed for 45 seconds. The second test requires that the popping kettle be dumped after the fire in the kettle has started. This pours burning oil on top of popped corn in the bottom of the cabinet, which can be very flammable, causing the fire to spread. In addition, like the first test, the second test requires a 45 second delay between breaking of the fusible link and the discharge of the fire extinguishing agent. To pass these tests, the fire containment/suppression system should be able to contain the fires within the cabinet until it is extinguished by the extinguishing agent.

The fire containment/suppression systems disclosed in the '014 patent perform well in the first and second tests outlined above, especially for popcorn cabinets having open sides of about three feet in width or less. It would be advantageous, however, to provide additional fire containment and/or suppression systems for commercial popcorn machines, especially those having open sides of, for example, four feet or more in width.

DETAILED DESCRIPTION

Figure 1:
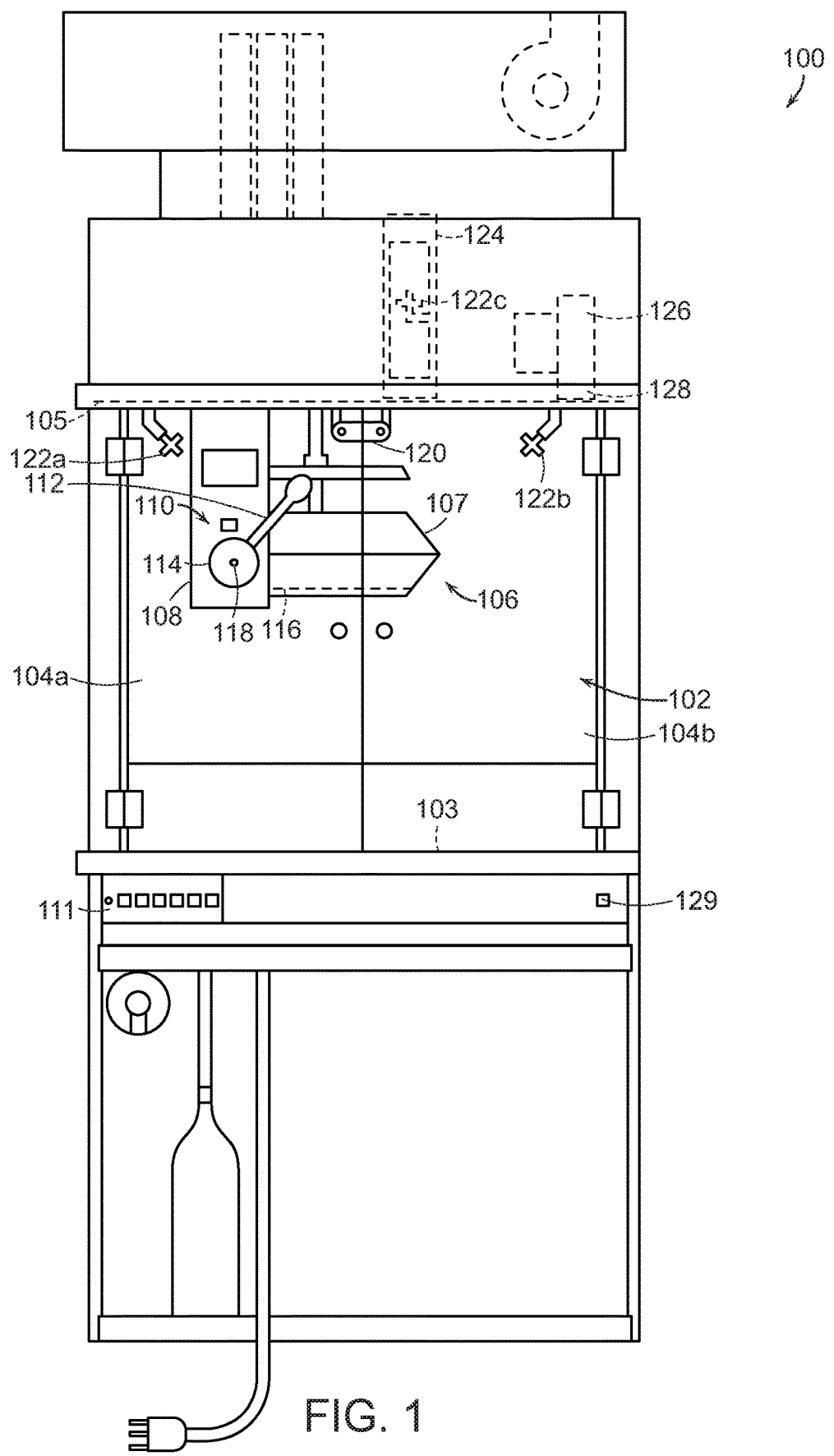
FIG. 1 is a front view of a popcorn machine having a kettle locking system configured in accordance with an embodiment of the present technology.

The following disclosure describes various embodiments of systems and methods for automatically locking a popping kettle in an upright position in a popcorn machine in response to, for example, an operating temperature that exceeds an upper limit of a normal operating temperature range, but is below the temperature required to start a fire in the popping kettle. As described herein, such systems can be used in conjunction with other fire containment and/or suppression systems to advantageously prevent the spread of fire from the popping kettle to the popped popcorn held in the cabinet beneath the kettle. For example, as described above at least one safety test requires that there be a 45 second delay between when a fire starts in the popping kettle, and when the fire suppression system is activated to discharge fire extinguishing agent onto the fire. Additionally, this test also requires that the kettle be dumped after the fire has started, causing the fire to spread onto the popped popcorn in the bottom of the cabinet before the 45 seconds has elapsed. Use of the kettle locking systems described herein, however, prevents the kettle from being dumped in such a situation. As a result, the kettle dumping requirement of this test is essentially eliminated, and popcorn machines (including those having relatively wide doors) are able to pass this test using existing fire suppression systems, such as those described in the '014 patent.

Certain details are set forth in the following description and in FIGS. 1-3 to provide a thorough understanding of various embodiments of the present technology. In other instances, well-known structures, materials, operations and/or systems often associated with popcorn machines, electrical circuits for such machines, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Many of the details, dimensions, angles and other features shown in the Figures are merely illustrative of particular embodiments of the disclosure. Accordingly, other embodiments can have other details, dimensions, angles and features without departing from the spirit or scope of the present invention. In addition, those of ordinary skill in the art will appreciate that further embodiments of the invention can be practiced without several of the details described below.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 is a front view of a popcorn machine 100 having a kettle lock system 110 configured in accordance with an embodiment of the present technology. In the illustrated embodiment, the popcorn machine 100 includes a kettle assembly 106 positioned in a cabinet 102. The cabinet 102 can include doors 104 (e.g., glass doors, identified individually as a first door 104a and a second door 104b) that swing open to provide access to the kettle assembly 106 and to popcorn contained on a lower surface 103 of the cabinet 102.

The kettle assembly 106 includes a popping kettle 107 and one or more electrical heating elements 116 mounted to the popping kettle 107 proximate a lower surface thereof. In the illustrated embodiment, the heating elements 116 are configured to heat popping oil and unpopped popcorn placed in the kettle 107 to a temperature sufficient to pop the popcorn, such as a temperature of about 410 to 450 degrees Fahrenheit (F). This temperature range can be referred to as a normal operating temperature range. An operator can operate the kettle assembly 106 and other systems of the popcorn machine 100 by depressing buttons and/or other suitable control features on a control panel 111. The kettle assembly 106 is mounted to an upper wall 105 of the cabinet 102 by means of a support 108 that extends downwardly from the upper wall 105. More specifically, in the illustrated embodiment the kettle assembly 106 is pivotally mounted to the support 108 by means of a rotatable kettle support 114 which has a dump handle 112 extending outwardly therefrom. After a popping cycle is complete, the operator can empty the kettle 107 by grasping the dump handle 112 and rotating it downwardly about a pivot axis 118 in a conventional manner. This action rotates the kettle 107 downwardly in the same direction, thereby dumping any popcorn remaining in the kettle 107 onto the cabinet surface 103.

In operation, oil and unpopped popcorn of appropriate quantities are placed in the popping kettle 107, and the operator initiates the popping cycle via the control panel 111. As the popcorn pops and fills the kettle 107, it spill out over the sides of the kettle 107 and onto the lower surface 103 of the cabinet 102. At the conclusion of the popping cycle, the operator can open one of the cabinet doors 104 and empty the kettle 107 of any remaining contents by rotating the dump handle 112 downwardly as described above.

In some embodiments, the operating temperature of the kettle 107 can be automatically controlled by use of a temperature sensor (e.g., by one or more thermostats, thermocouples, etc.) to prevent the oil therein from overheating and igniting. If there is a failure of the kettle temperature control system, however, it is possible for the heating elements 116 to heat the popping oil to the flash point (e.g., about 750 degrees F.) and ignite the oil. To address this concern, the popcorn machine 100 can further include a fusible link 120 that is operably connected to a fire containment/suppression system, such as the system described in the '014 patent. In the event of a fire, the fusible link 120 will melt and break from the excessive heat, causing the fire suppression system to spray fire extinguishing agent onto the fire via one or more nozzles 122 (identified individually as a first nozzle 122a and a second nozzle 122b), and into a cabinet exhaust vent 124 via a third nozzle 122c. Additionally, breaking the fusible link 120 also provides power to a blower 126 that flows fresh air into the cabinet 102 via an inlet air vent 128. This fresh air can help to contain the fire within the cabinet 102 and keep it from spreading outside the cabinet via, for example, an open door 104. In some embodiments, the popcorn machine 100 can include a button 129 or other user input device that is operably connected to the fire suppression system. The button 129 can be used by an operator to manually activate the fire suppression system in addition to or alternatively to the fusible link 120 in the event of a fire.

As described in greater detail below, in a further aspect of the illustrated embodiment the kettle lock system 110 prevents the kettle 107 from being dumped if there is a malfunction in the kettle temperature control system that results in a high temperature condition within the popcorn machine 100. The high temperature condition can include the detection of a fire within the popcorn machine 100 (e.g., within the cabinet 102 or the kettle 107) and/or the detection of a high temperature within the kettle 107, the cabinet 102, or elsewhere within the popcorn machine 100 that is conducive to a fire. For example, in some embodiments the kettle lock system 110 prevents the kettle 107 from being dumped if the temperature of the kettle 107 exceeds the normal operating temperature of the kettle 107. More particularly, in some embodiments the kettle lock system 110 can be configured to lock the kettle 107 in the upright position if the kettle temperature reaches 550 degrees F., which can be referred to as the high limit set point. By locking the kettle 107 at this temperature, the kettle lock system 110 prevents the kettle 107 from being dumped if the popping oil subsequently reaches the flash point and ignites. This feature prevents an operator from inadvertently dumping burning oil onto the popcorn in the bottom of the cabinet 102, and thereby spreading the fire and making it more difficult to contain and extinguish.

Figure 2A:
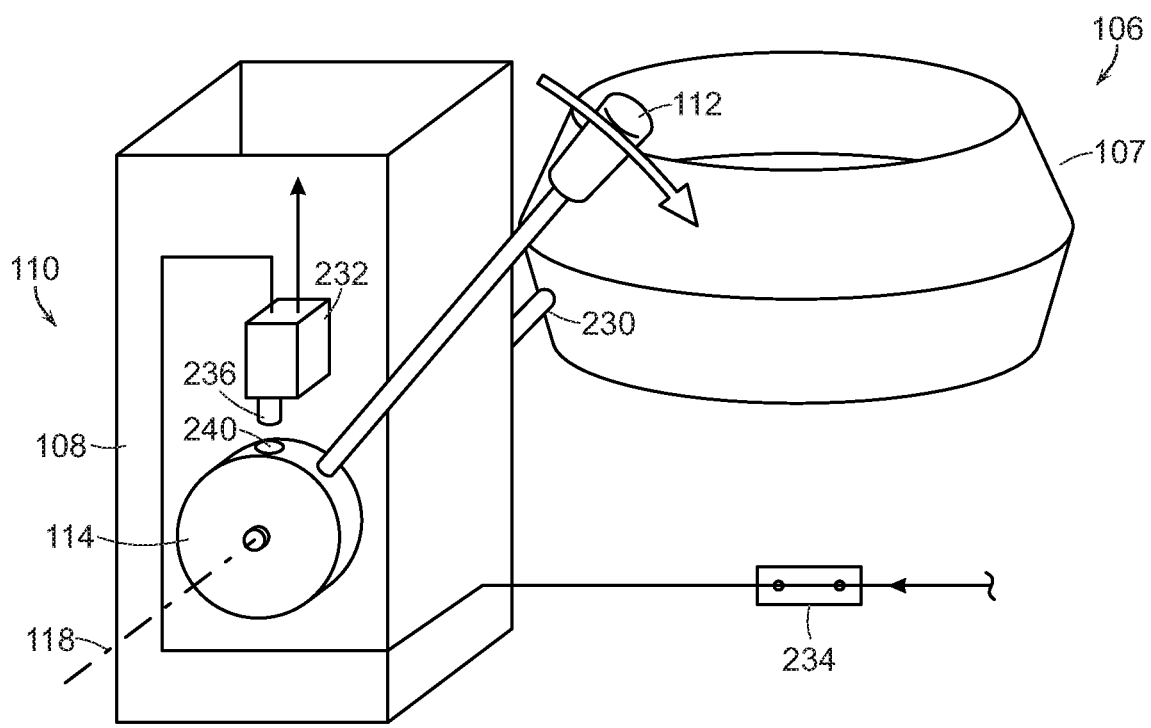
FIG. 2A is an enlarged, partially schematic isometric view of the popping kettle and locking system of FIG. 1.
Figure 2B:
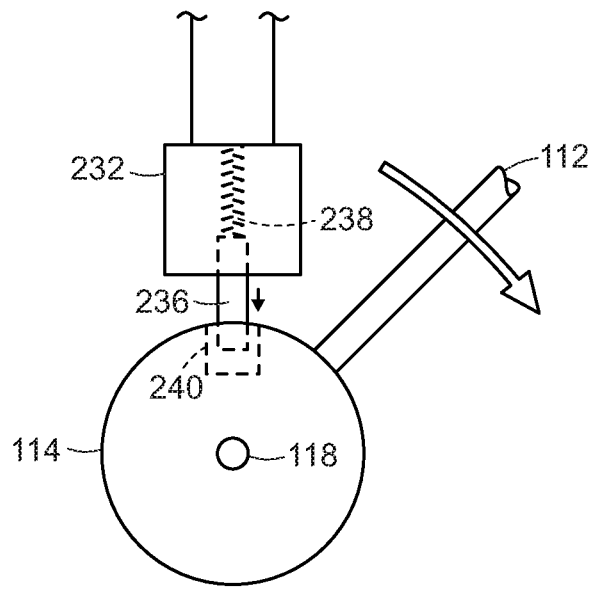
FIG. 2B is an enlarged, partially schematic front view of a portion of the kettle locking system configured in accordance with an embodiment of the present technology.

FIG. 2A is an enlarged isometric view of a portion of the kettle lock system 110, and FIG. 2B is an enlarged view of a kettle lock apparatus configured in accordance with an embodiment of the present technology. Referring first to FIG. 2A, the kettle assembly 106 is attached to the rotatable kettle support 114 by an arm 230. As described above, during normal operation an operator can empty the kettle 107 by rotating the dump handle 112 downwardly (in a clockwise direction as seen from FIG. 2A) about the pivot axis 118. The rotatable kettle support 114 can be operably coupled to a spring or other biasing member (not shown) that automatically returns the kettle 107 to the upright position shown in FIG. 2A.

In the illustrated embodiment, the kettle lock system 110 includes a locking apparatus that is configured to lock the dump handle 112 in the upward position shown in FIG. 2A in the event that the popping kettle temperature exceeds the upper limit of the normal operating range (e.g., 450 degrees F.) and reaches the high limit set point temperature (e.g., 550 degrees F.). More specifically, referring to FIGS. 2A and 2B together, in the illustrated embodiment the kettle locking apparatus includes a linear solenoid 232 that is electrically connected in series with a temperature sensor, such as a normally closed thermostat 234, that is positioned at least proximate to the popping kettle 107 (e.g., on a bottom surface of the kettle 107). The locking apparatus can further include a locking element that is configured to engage an engagement feature on or in the kettle support 114 to lock the kettle support 114 in the upright position. In the illustrated embodiment, the locking element is a linearly moveable plunger or pin 236 that is positioned at least partially within the solenoid 232 and is biased outwardly by a biasing member 238 (e.g., a coil spring). The engagement feature can be a hole 240 (e.g., a cylindrical hole, a recess, etc.) that extends radially into the kettle support 114, as shown in FIG. 2B, and is configured (e.g., shaped, sized, oriented, etc.) to receive at least a portion of the locking element therein. The solenoid 232 and pin 236 can be mounted to the support 108, the upper wall 105 of the cabinet 102, and/or another portion of the popcorn machine 100.

In operation, as long as the popping kettle 107 remains below the high limit set point temperature (e.g., 550 degrees F.), the thermostat 234 remains closed and the solenoid 232 is energized. When the solenoid 232 is energized, the pin 236 is retracted inwardly away from the kettle support 114 and the hole 240 as shown in FIG. 2A, and this enables the kettle 107 to be dumped by rotation of the dump handle 112 in a conventional manner. However, if the temperature of the popping kettle 107 reaches the high limit set point, the thermostat 234 opens and cuts power to the solenoid 232. When the solenoid 232 is de-energized in this manner, the biasing number 238 drives the pin 236 outwardly and into the hole 240 in the kettle support 114, as shown in FIG. 2B. This locks the kettle support 114 (and consequently, the dump handle 112 and the popping kettle 107) in the upright position, and prevents the operator from inadvertently dumping burning popping oil onto popped popcorn sitting in the bottom of the cabinet 102 (FIG. 1) and thereby spreading the fire.

Figure 3:
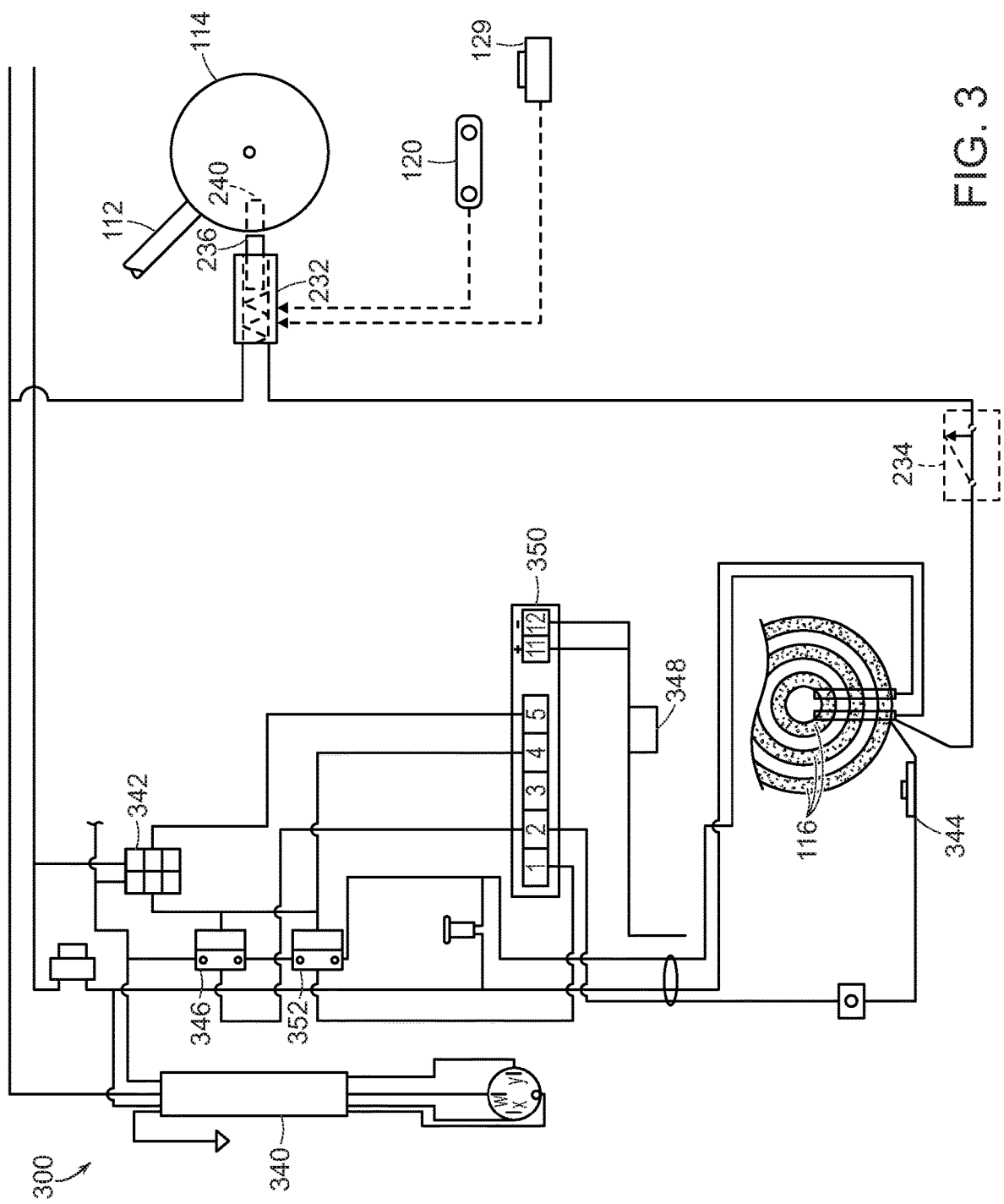
FIG. 3 is a schematic diagram of an electrical circuit for operation of the popping kettle and kettle locking system of FIGS. 1-2B, configured in accordance with an embodiment of the present technology.

FIG. 3 is a schematic diagram of a portion of an electrical circuit 300 for operating the kettle assembly 106 and the kettle lock system 110 described above in accordance with an embodiment of the present technology. For purposes of clarity, FIG. 3 does not illustrate other portions of the electrical circuit 300 for operating other portions of the popcorn machine 100 (e.g., lighting systems, popcorn agitator systems, exhaust systems, oil pumps, etc.) because such systems are well known in the art and are unnecessary for a complete understanding of the present technology. As those of ordinary skill in the art will appreciate, FIG. 3 illustrates one embodiment of an electrical system suitable for operating the kettle assembly 106 and the kettle lock system 110 in accordance with the present technology. Accordingly, other embodiments can include other electrical components in other arrangements without departing from the present disclosure.

In the illustrated embodiment, the electrical system 300 includes a power cord 340 that is electrically connected to a kettle control switch 342, a first relay 346 and a second relay 352. The relays 346 and 352 are connected in series to one or more kettle heating elements 116 (e.g., resistive heating elements). The electrical circuit 300 further includes a thermostat 344 and a thermocouple 348 which are both operably connected to a temperature controller 350 (e.g., a Programmable Logic Controller (PLC)). The thermocouple 348 and the thermostat 344 are both positioned to detect the operating temperature of the kettle 107 in a known manner.

In normal operation, the power cord 340 is connected to a facility outlet to provide power to the popcorn machine 100. An operator can place the necessary ingredients (e.g., popping oil and unpopped corn) into the popping kettle 107 and initiate the popping cycle by operation of the switch 342. This enables power to flow to the heating elements 116 via the first relay 346 and the second relay 352. As the kettle 107 heats up, the thermocouple 348 senses the temperature and provides the temperature information to the temperature controller 350. Once the popping kettle 107 reaches the upper limit of the normal operating temperature range (e.g., about 450 degrees F.), the controller 350 opens the second relay 352, thereby cutting power to the heating elements 116 and preventing the temperature from exceeding the normal operating temperature. When the kettle temperature subsequently drops, the controller 350 closes the second relay 352 to again provide power to the heating elements 116. The temperature controller 350 can cycle the second relay 352 in this manner to maintain the kettle 107 at or near a desired operating temperature. If this primary temperature control system fails, however, the thermostat 344 can be configured to open at a temperature above the upper limit of the normal operating range (e.g., 550 degrees F.) and below the flash point of oil (e.g., about 750 degrees F.). As noted above, this temperature can be referred to herein as the "high limit set point" for ease of reference. When the thermostat 344 opens, it cuts power to the first relay 346 causing it to open, thereby cutting power to the heating elements 116 and causing the kettle temperature to drop before the kettle reaches the flash point of the popping oil.

If the primary temperature control system associated with the thermocouple 348 and the high limit temperature control system associated with the thermostat 344 both fail, the kettle 107 could potentially continue heating until it reaches the flash point of the popping oil, resulting in a fire in the kettle 107. The kettle lock system 110 of the present technology, however, will cause the kettle 106 to be locked in the upright position, thereby containing the fire within the kettle 107 and preventing the operator from inadvertently pouring the burning oil onto popcorn held in the cabinet 102 and spreading the fire. More specifically, if the kettle temperature reaches the high limit set point (e.g., 550 degrees F.), the thermostat 234 will open, thereby de-energizing the solenoid 232 and causing the pin 236 to extend outwardly into the hole 240 in the kettle support 114. This locks the kettle 107 in the upright position and contains the fire in the kettle 107, giving a fire suppression system (such as the fire suppression system described above and in the '014 patent) ample time to extinguish the fire before it spreads to other areas of the cabinet 102. For those machines not having a fire suppression system, locking the kettle 107 in the upright position can provide an operator with more time to extinguish the fire with, for example, a portable fire extinguisher and prevent the fire from spreading.

Although the kettle lock system 110 described above includes a linear solenoid, a locking element comprising a pin, and an engagement feature comprising a hole, in other embodiments kettle lock systems configured in accordance with the present technology can include other types of locking apparatuses and systems. For example, in other embodiments the kettle lock system can include a rotary solenoid that engages the kettle dumping mechanism to prevent the kettle from being dumped above a threshold temperature. In other embodiments, the solenoid 232 can be a normally open solenoid, and the biasing member 238 can retain the pin 236 away from the hole 240 when the temperature of the kettle 107 is below the preset temperature. In such embodiments, when the temperature of the kettle 107 reaches the preset temperature, the solenoid 232 can drive the pin 236 into the hole 240 on the kettle support 114. Moreover, in other embodiments the locking element and/or the engagement feature can have other suitable shapes and configurations for engaging one another to prevent rotation of the kettle support 114. For example, rather than a hole, the engagement feature can comprise a pin or other raised or protruding feature, a recess, or other feature that engages the locking element (e.g., a corresponding pin, recess, etc.) to prevent rotation of the kettle support 114. Additionally, in other embodiments the locking element (e.g., the pin 236), the solenoid 232, and/or other components of the locking apparatus can be formed on or otherwise attached to the kettle support 114 instead of the support 108, while the engagement feature (e.g., the hole 240) can be formed on the support 108 or another portion of the popcorn machine 100 instead of the kettle support 114.

Similarly, in other embodiments various types of electrical circuits and arrangements of temperature sensors (e.g., thermocouples, thermostats, etc.), operating at different temperature levels than those set forth above, can be used to actuate a kettle locking apparatus in accordance with the present disclosure. Likewise, in other embodiments a kettle locking apparatus in accordance with the present disclosure can be manually actuated by a user. For example, the popcorn machine 100 can include a kettle locking button or other user input device (e.g., on the control panel 111) for manually actuating a kettle locking apparatus to lock the kettle 107. More specifically, in some embodiments pushing the button can de-energize the solenoid 232 to permit the pin 236 to extend outwardly from the solenoid 232. In some embodiments, the button 129 can be operably connected to both the kettle locking system and the fire suppression system, and by activating (e.g., depressing) the button 129 an operator can manually actuate both the fire suppression system and the kettle locking system. In yet other embodiments, the kettle locking apparatus can be operably coupled to the fusible link 120 such that breaking the fusible link 120 locks the kettle 107. In still further embodiments, the kettle locking apparatus can be operably coupled to an optical or other element that is configured to detect a fire or other unsafe operating condition in the popcorn machine 100. Accordingly, in some embodiments the kettle locking apparatus can be configured to lock the kettle 107 upon detection of a fire within the cabinet 102 and/or the kettle 107, and/or upon detection of an abnormally high temperature within the popcorn machine 100, as described in detail above. Accordingly, although one embodiment of a kettle lock system has been described in detail above, the present technology is not limited to this particular embodiment.

Aspects of the popcorn machine 100 (e.g., the control panel 111, the temperature controller 350, etc.) can be embodied in a special purpose computer or data processor that is specifically programmed, configured, or constructed to perform one or more of the operations described in detail herein. While aspects of the invention, such as certain functions, are described as being performed exclusively on a single device, the invention can also be practiced in distributed environments where functions are shared among disparate devices. Although specific circuitry is described above, those or ordinary skill in the art will recognize that a microprocessor-based system could also be used where any logical decisions are configured in software.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

I claim:

1. A popcorn machine, comprising:
   a rotatable kettle support, wherein the kettle support includes a hole extending therein;
   a popping kettle operably coupled to the rotatable kettle support, wherein the kettle is configured to pop popcorn placed therein when the kettle is in a popping position, and wherein the kettle is configured to discharge the popcorn when the kettle is moved from the popping position to a dumping position;
   a temperature sensor positioned to detect a high temperature condition within the popcorn machine; and
   a kettle lock system operably coupled to the kettle, wherein the kettle lock system includes a pin that is configured to be automatically driven into the hole in the kettle support upon detection of the high temperature condition within the popcorn machine to lock the kettle in the popping position.

2. The popcorn machine of claim 1 wherein the temperature sensor is positioned to detect a fire within the popcorn machine, and wherein the kettle lock system is configured to automatically drive the pin into the hole to lock the kettle in the popping position in response to detection of the fire within the popcorn machine.

3. The popcorn machine of claim 1 wherein the temperature sensor is positioned to detect a fire within the kettle, and wherein the kettle lock system is configured to automatically drive the pin into the hole to lock the kettle in the popping position in response to detection of the fire within the popping kettle.

4. The popcorn machine of claim 1 wherein the kettle lock system is configured to automatically drive the pin into the hole to lock the kettle in the popping position in response to the kettle reaching a preset temperature, wherein the kettle is configured to pop popcorn at a temperature within a normal operating range having an upper limit, and wherein the preset temperature is above the upper limit of the normal operating range and below a temperature at which popping oil ignites and burns.

5. The popcorn machine of claim 1 wherein the kettle lock system is configured to drive the pin into the hole to automatically lock the kettle in the popping position when the kettle reaches a temperature of at least approximately 550 degrees Fahrenheit, and wherein the kettle is manually movable from the popping position to the dumping position.

6. The popcorn machine of claim 1, further comprising a button operably connected to the kettle lock system, wherein manual actuation of the button locks the kettle in the popping position.

7. A popcorn machine, comprising:
   a rotatable kettle support, wherein the kettle support includes a recess;
   a popping kettle operably coupled to the rotatable kettle support, wherein the kettle is configured to pop popcorn placed therein when the kettle is in a popping position, and wherein the kettle is configured to discharge the popcorn when the kettle is moved from the popping position to a dumping position;
   a temperature sensor positioned to detect a preset temperature within the popcorn machine; and
   a kettle lock system operably coupled to the kettle, wherein the kettle lock system includes a pin, and wherein
      the kettle lock system is configured to automatically lock the kettle in the popping position when the kettle reaches the preset temperature,
      when the kettle is below the preset temperature, the pin is retracted away from the recess to permit movement of the kettle to the dumping position, and
      when the kettle reaches the preset temperature, the pin extends radially into the recess in the kettle support to lock the kettle in the popping position.

8. A popcorn machine, comprising:
   a cabinet;
   a popping kettle mounted within the cabinet, wherein the kettle is configured to pop popcorn placed therein when the kettle is in a popping position, and wherein the kettle is configured to discharge the popcorn when the kettle is moved from the popping position to a dumping position;
   a fire suppression system configured to spray fire extinguishing agent into the cabinet; and
   a kettle lock system operably coupled to the kettle, wherein the kettle lock system is configured to automatically lock the kettle in the popping position in response to activation of the fire suppression system.

9. The popcorn machine of claim 8, further comprising a kettle support positioned within the cabinet, wherein the popping kettle is operably coupled to the kettle support, wherein the kettle lock system includes a locking member, and wherein the kettle lock system is configured to engage the locking member with the kettle support in response to activation of the fire suppression system to lock the kettle in the popping position.

10. The popcorn machine of claim 9 wherein the locking member is a pin, wherein the kettle support includes a hole, and wherein the kettle lock system is configured to drive the pin into the hole in response to activation of the fire suppression system to lock the kettle in the popping position.

11. The popcorn machine of claim 10 wherein the kettle lock system further includes a solenoid positioned at least partially around the pin, wherein the kettle lock system is configured to energize the solenoid to maintain the pin away from the hole before activation of the fire suppression system.

12. The popcorn machine of claim 11 wherein the kettle lock system is configured to de-energize the solenoid to drive the pin into the hole in response to activation of the fire suppression system.

13. The popcorn machine of claim 8, further comprising a user input device operably connected to the fire suppression system, wherein manual actuation of the user input device activates the fire suppression system.

14. The popcorn machine of claim 8, further comprising a fusible link operably coupled to fire suppression system, wherein the fusible link is configured to melt and break in response to a high temperature condition within the popcorn machine to activate the fire suppression system.

15. A popcorn machine, comprising
a cabinet;
a kettle support mounted within the cabinet, wherein the kettle support includes a hole extending into the kettle support;
a kettle positioned in the cabinet, wherein the kettle is rotatable from an upright position to a dumping position;
a temperature sensor positioned to detect a temperature of the kettle; and
a locking apparatus electrically coupled to the temperature sensor, wherein the locking apparatus includes a linearly moveable pin and a biasing member, wherein the biasing member is configured to drive the pin into the hole in the kettle support to prevent rotation of the kettle and lock the kettle in the upright position when the temperature sensor detects that the temperature of the kettle is at a preset temperature.

16. The popcorn machine of claim 15 wherein the temperature sensor is a normally-closed thermostat positioned on a bottom surface of the kettle, and wherein the thermostat opens and cuts power to the locking apparatus when the thermostat detects that the temperature of the kettle is above the preset temperature.

17. The popcorn machine of claim 15 wherein the kettle is configured to pop popcorn at a temperature within a normal operating range of about 410 to 450 degrees Fahrenheit (F), and wherein the preset temperature is above 450 degrees F. and below a temperature of about 750 degrees F.

18. A method of operating a popcorn machine having a popping kettle operably coupled to a kettle support, the method comprising:
popping popcorn in the popping kettle when the kettle is in a popping position, wherein the kettle is configured to discharge the popcorn when the kettle is moved from the popping position to a dumping position;
detecting if there is a high temperature condition within the popcorn machine; and
if there is not at high temperature condition within the popcorn machine, energizing a locking apparatus including a pin to permit movement of the kettle from the popping position to the dumping position; or
if there is a high temperature condition within the popcorn machine, de-energizing the locking apparatus to lock the kettle in the position by driving the pin into a hole in the kettle support.

19. The method of claim 18 wherein
the locking apparatus includes a solenoid,
the pin is positioned at least partially within the solenoid,
energizing the locking apparatus includes powering the solenoid to maintain the pin in a retracted position away from the engagement feature, and
de-energizing the locking apparatus includes cutting power to the solenoid to drive the pin into the hole.

20. The method of claim 18 wherein detecting a high temperature condition within the popcorn machine includes detecting that a temperature of the popping kettle is above a preset temperature.

21. The method of claim 18 wherein detecting a high temperature condition within the popcorn machine includes detecting that there is a fire in the popcorn machine.

* * * * *

UNITED STATES PATENT AND TRADEMARK OFFICE
CERTIFICATE OF CORRECTION

| | | |
|---|---|---|
| PATENT NO. | : 11,291,227 B2 | Page 1 of 1 |
| APPLICATION NO. | : 16/211067 | |
| DATED | : April 5, 2022 | |
| INVENTOR(S) | : Nenad Vidojevic | |

It is certified that error appears in the above-identified patent and that said Letters Patent is hereby corrected as shown below:

In the Claims

In Column 12, Line 19, in Claim 18, delete "at high" and insert -- a high --.

In Column 12, Line 26, in Claim 18, delete "position" and insert -- popping position --.

Signed and Sealed this
Seventeenth Day of October, 2023

Katherine Kelly Vidal
*Director of the United States Patent and Trademark Office*